United States Patent [19]

Ichikawa et al.

[11] Patent Number: 4,837,294

[45] Date of Patent: Jun. 6, 1989

[54] POLYARYLENE THIOETHER COMPOSITION CONTAINING POLYARYLENE ETHER NUCLEATING AGENT

[75] Inventors: Yukio Ichikawa; Takashi Kaneko; Yoshikatsu Satake; Takayuki Katto, all of Iwaki, Japan

[73] Assignee: Kureha Kagaku Kogyo Kabushiki Kaisha, Tokyo, Japan

[21] Appl. No.: 182,172

[22] Filed: Apr. 15, 1988

[30] Foreign Application Priority Data

Apr. 17, 1987 [JP] Japan .................................. 62-94464

[51] Int. Cl.$^4$ ............................................. C08G 75/02
[52] U.S. Cl. .................................. 528/388; 524/392; 525/537
[58] Field of Search ........................ 528/388; 525/537; 524/392

[56] References Cited

FOREIGN PATENT DOCUMENTS 1231030 10/1986 Japan .................................. 528/388
2192831 1/1988 Japan .................................. 528/388

Primary Examiner—Harold D. Anderson
Assistant Examiner—T. Mason
Attorney, Agent, or Firm—Oblon, Spivak, McClelland, Maier, & Neustadt

[57] ABSTRACT

Disclosed herein is a polyarylene thioether composition comprising: 100 parts by weight of a polyarylene thioether (A) which contains not less than 70 wt % of a repeating unit of

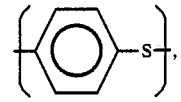

and 0.01 to 15 parts by weight of a polyarylene thioether (B), which is a nucleating agent and contains not less than 50 wt % of a repeating unit of as the main constituent and has a melting point of not lower than 290° C. or a melt crystallization temperature of not lower than 220° C. This composition may further comprise 0.1 to 300 parts by weight of an inorganic filler and/or a fibrous filler. A 50% crystallization time, $t_{\frac{1}{2}}$, at 250° C. of the polyarylene thioether composition is not more than 1/1.5 of the 50% crystallization time of a polyarylene thioether which does not contain the polyarylene thioether (B) Accordingly, its melt molding cycle is short and its molded product has a high strength.

10 Claims, No Drawings

POLYARYLENE THIOETHER COMPOSITION CONTAINING POLYARYLENE ETHER NUCLEATING AGENT

BACKGROUND OF THE INVENTION

The present invention relates to a polyarylene thioether (hereinafter referred to as "PATE") composition which has a high crystallization rate and a fine spherulite structure.

The present invention also relates to a PATE composition which has a short cycle of melt molding and produces a molded product having excellent mechanical properties.

More particularly, the present invention relates to a PATE composition which comprises 100 parts by weight of PATE (A) containing not less than 70 wt % of repeating unit of

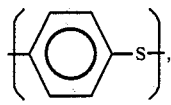

and 0.01 to 15 parts by weight of PATE (B) which contains not less than 50 wt % of repeating unit of

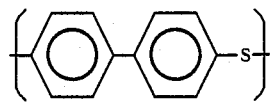

and has a melting point (hereinafter referred to as "Tm") of not lower than 290° C. or a melt crystallizing temperature (Hereinafter referred to as "$T_{c2}$") of not lower than 220° C. and which is added to PATE (A) as a nucleating agent.

PATE is a resin developed as a heat-resistant, chemical-resistant and flameresistant thermoplastic resin. Particularly, since PATE is crystalline, PATE can be melt processed with injection molding, extrusion molding, etc. and has a characteristic points that molded products obtained from PATE are excellent in physical properties such as dimensional stability, strength, hardness, and insulating property.

Taking advantage of this characteristic point, PATE is used in the fields of electricity, electronics, cars, aeroplanes, precision machinery and chemical engineering, etc.

However, the conventional PATE has a defect that its crystallization rate is low and accordingly often results to have coarse spherulites.

Because of the above defect, when PATE is fabricated, for example, with injection molding, there has been a problem which lead to practical defects such as long molding cycle, many occurrence of flashes and low mechanical properties of molded products.

As a result of extensive studies on a nucleating agent effective to PATE, the present invention have found that use of a PATE (B), which contains not less than 50 wt % of repeating unit of

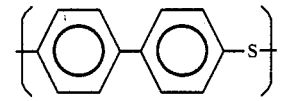

as the main constituent and has Tm of not lower than 290° C. or $T_{c2}$ of not lower than 220° C., as a nucleating agent, produces an excellent effect, namely, improvement of the crystallization rate and reduction in spherulite size. The present invention has been achieved on the basis of these findings.

SUMMARY OF THE INVENTION

An object of the present invention is to provide a PATE composition of which melt molded product has fine spherulites and a high crystallization rate.

Another object of the present invention is to provide a PATE composition which can produce a molded product having a high strength with a short cycle of melt molding.

Still another object of the present invention is to provide a PATE composition suitable for various processings such as inflation molding, injection molding, compression molding and blow molding and, particularly, for injection molding.

A further object of the present invention is to provide a PATE composition comprising:
100 parts by weight of PATE (A) which contains not less than 70 wt % of repeating unit of

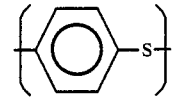

and 0.01 to 15 parts by weight of a polymer, as a nucleating agent, consisting of a polyarylene thioether (B) which contains not less than 50 wt of repeating unit of

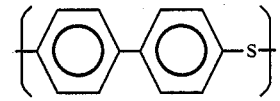

as the main constituent and has Tm of not lower than 290° C. or $T_{c2}$ of not lower than 220° C., with or without 0.1 to 300 parts by weight of an inorganic filler and/or a fibrous filler; and being characterized in that the 50% crystallization time, $\tau_{\frac{1}{2}}$, at 250° C. is not more than 1/1,5 of $\tau_{\frac{1}{2}}$ of a polyarylene thioether which does not contain polymer (B).

DETAILED DESCRIPTION OF THE INVENTION

Composition of PATE

PATE (A)

Although PATE generally means a polymer having a repeating unit of —Ar—S— (wherein Ar is an arylene group), as a constituent, PATE (A) according to the present invention has paraphenylene group among the arylene groups as the main constituent.

The words "has the paraphenylene group as the main constituent" means that the PATE contains paraphenylene group of not less than 60 wt %, preferably not less than 75 wt % in all arylene groups in it.

PATE (A) having paraphenylene group as the main constituent is preferable from the viewpoint of physical properties of the composition such as heat-resistance, moldability and mechanical properties.

As an arylene group other than paraphenylene group, m-phenylene group,

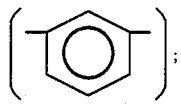

o-phenylene group,

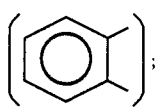

alkyl-substituted phenylene group,

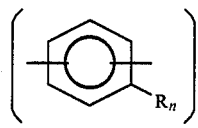

(R is an alkyl group, preferably a lower alkyl group and n is an integer of 1 to 4); p,p'-diphenylene sulfon group,

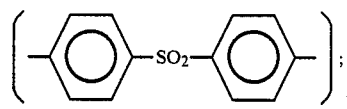

p,p'-diphenylene ether group,

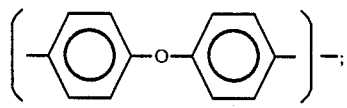

p,p'-diphenylene carbonyl group,

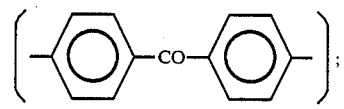

naphthalene group,

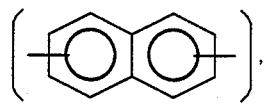

etc. can be used. (These phenylene groups and naphthalene group may be substituted by 1 to 4 alkyl groups having 1 to 5 carbon atoms).

From the viewpoint of the processability, copolymer containing different kinds of repeating unit is preferable, in some cases, to a homopolymer consisting only of the repeating unit of

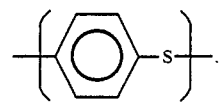

As the copolymer, a copolymer of

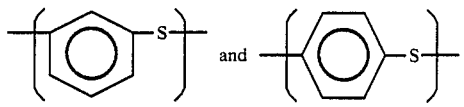

is preferred. Particularly, those containing the respective repeating unit in a block form is preferred to those containing it in a random form (for instance, as described in EPC No. 166,451-A).

The block copolymer described in EPC No. 166,451-A consists of repeating units of

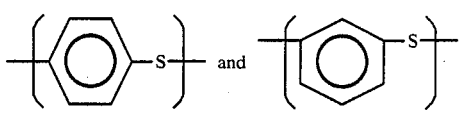

and (i) blocks having a repeating unit of

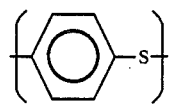

of 20 to 5,000 in number exist in the molecular chain, (ii) its molar fraction is in the range of 0.50 to 0.98, (iii) its melt viscosity, $\eta^*$, measured at a temperature of 310° C. and a shear rate of 200/second is 50 to 100,000 poise, (iv) its glass transition point is 20° to 80° C. and (v) its crystalline melting point is 250° to 285C.

The reason why the block copolymer is preferable to the random copolymer is, because the block-copolymer is remarkably excellent in physical properties (heat resistance, mechanical property, etc.) although the block- and random-copolymers are substantially equal in their processabilities. 5 to 30 wt % of repeating unit of

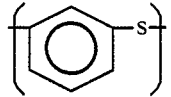

in the block copolymer is preferable and 10 to 25 wt % is particularly preferable.

As the PATE (A) according to the present invention, those having substantially linear structure are preferred from the viewpoint of physical properties.

However, within a range of not spoiling the physical properties of molded products, a cross-linked PATE obtained by using a minute amount of a crosslinking agent (for instance, 1,2,4-trihalobenzene) during polymerization is allowable. As the PATE (A) according to the present invention, the PATE which is not thermally cross-linked is preferable, because the PATE which is thermally cross-linked has many branched and cross-linked structures, its molded product is poor in mechanical properties and is severely colored and thermal stability of the composition during melt processing is low. Accordingly, such a PATE is not preferable from the viewpoint of physical properties and processability of the composition and physical properties of the molded product.

As the PATE (A) according to the present invention, those having a melting point of over 250° C. are preferable. Because, when the melting point is below 250° C., the largest characteristic point as a heat-resistant polymer is spoiled.

The PATE which is favorable for the present invention can generally be manufactured by bringing an alkali metal sulfide (for instance, sodium sulfide) and a halo-aromatic compound consisting mainly of paradihalobenzene into dehalogenation- and sulfidation-reaction in an aprotic, organic polar solvent [for instance, N-methylpyrrolidone (hereinafter referred to as "NMP")]. Such PATE can be economically manufactured by the method described in U.S. Pat. No. 4,645,826 applied by the present inventors.

The method described in U.S. Pat. No. 4,645,826 is a method to manufacture PAS of high molecular weight by reacting an alkali metal sulfide with a dihaloaromatic compound in an organic amide solvent, comprising the two steps of:

(1) carrying out the reaction at a temperature of from 180° to 235° C. in the presence of 0.5 to 2.4 mol of water per mol of alkali metal sulfide to produce a poly(arylene sulfide) having a melt viscosity of 5 to 300 poise at a conversion ratio of 50 to 98 mol %; and (2) continuing the reaction (1) while increasing water content to from 2.5 to 7.0 mol per mol of alkali metal sulfide and raising the temperature to from 245° to 290° C..

As an another method, the method of obtaining PATE of a high molecular weight by adding a large amount of a polymerization aid such as salt of carboxylic acid, etc. can be used (refer to U.S. Pat. No. 3,919,177). However, this method is disadvantageous from an economical stand point.

Polymer as a nucleating agent [PATE (B)]

A polymer used as a nucleating agent (hereinafter referred to as "nucleating polymer") in the present invention also belongs to the category of PATE and an arylene group (Ar) of the repeating unit of —Ar—S) contains p,p'-diphenylene group,

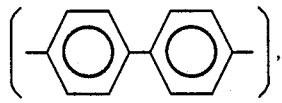

as a constituent.

Such a nucleating polymer is the polymer having Tm of not lower than 290° C., preferably not lower than 330° C., more preferably not lower than 350° C. or Tc$_2$ of not lower than 220° C., preferably not lower than 240° C., more preferably not lower than 250° C. If Tm is lower than 290° C. and Tc$_2$ is lower than 220° C., the nucleating effect, namely, the improvement of crystallization rate and micronization of spherulite size are insufficient and therefore such polymer is not preferable.

In determining Tm and Tc$_2$, a DSC (differential scanning calorimeter) is used and Tm is the peak melting temperature when the temperature is raised at a rate of 10° C./minute and Tc$_2$ is the peak crystallization temperature when the temperature is raised to Tm +50° C. and cooled at a rate of 10° C./minute An arylene thioether group as a component other than the main component of the nucleating polymer of the present invention can be various arylene groups which were described above in the item of PATE (A).

A nucleating polymer in the present invention is a PATE having a repeating unit of —Ar—S) as a constituent wherein the arylene group (Ar) is a p,p'-diphenylene group,

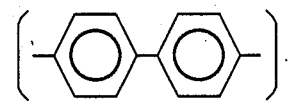

A polymer consisting only of this specific arylene thioether group,

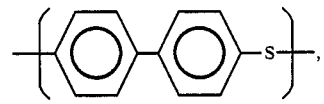

is particularly preferable as a nucleating polymer, because it has Tm of 400° to 450° C. and Tc$_2$ of 280° to 350° C. and has a remarkably excellent nucleating effect. However, polymers consisting of this specific arylene thioether group and other arylene thioether groups are also usable if their Tm and Tc$_2$ satisfy the above conditions. In this case, the ratio of this specific arylene thioether unit in the polymer is preferably not less than 50 wt %, more preferably not less than 55 wt %. If the ratio is less than 50 wt %, the effect as a nucleating polymer is insufficient and the ratio is not preferable. Among arylene thioether groups other than the specific arylene thioether group, less than 50 wt % of paraphenylene thioether group is preferable, and less than 45 wt % of the group is more preferable.

The amount of nucleating polymer to be added according to the present invention is 0.01 to 15 parts, preferably 1 to 15 parts, more preferably 1 to 12 parts by weight to 100 parts by weight of PATE (A). If it is less than 0.01 part by weight, the nucleating effect is poor, while addition of more than 15 parts by weight does not increase the nucleating effect in proportion to the amount.

A nucleating polymer can be added by any optional method. For instance, a method of adding a nucleating polymer as it is or in a form of dispersion to a powdery PATE (A) (when a solvent is used, the solvent is removed after the addition to PATE (A)), a method of adding a nucleating polymer at the time of molding, or a method of adding a nucleating polymer to a slurry of PATE (A) after the polymerization and removing water from the mixture, may be adopted. It is also possible to prepare what is called a master batch by mixing more than a predetermined amount of nucleating polymer with PATE (A) and kneading the master batch with the PATE (A) to a predetermined concentration of the nucleating polymer.

Composition

The composition according to the present invention comprises PATE (A), PATE (B) as a nucleating agent and, when necessary, a filler.

The words "comprises" means that the composition may contain supplementary component(s) unless the addition of the component is not contrary to the purpose of the present invention.

Further, the composition according to the present invention includes not only the material formed by mixing each component as powder but also the material of which resin component is in a coherent state formed through its molten state. The coherent state is the representative one and is generally prepared as pellets, etc. The powdery state of the composition can be produced by uniformly mixing all component with a blender, a mixer or a mill.

A composition according to the present invention is characterized in that the 50% crystallization time, $\tau_{\frac{1}{2}}$, at 250° C. is not more than 1/1.5, usually not more than 1/3, of the time of a composition which contains no nucleating polymer. The method of measuring $\tau_{\frac{1}{2}}$ will be described later.

Blend

A PATE composition according to the present invention can be applied to various melt processings by itself, but it can also be used as a blend by mixing (i) a fibrous filler such as glass fiber, carbon fiber, silica fiber, alumina fiber, silicon carbide fiber, zirconia fiber, calcium titanate fiber, wollastonite, calcium sulfate fiber and alamide fiber, and/or (ii) an inorganic powdery filler such as talc, mica, clay, kaolin, calcium carbonate, magnesium carbonate, calcium silicate, magnesium silicate, silica, alumina, titanium white, carbon black, calcium sulfate, iron oxide, zinc oxide and copper oxide with the PATE composition.

Furthermore, a PATE composition according to the present invention can be used as a blend with one or more selected from the group consisting of (iii) synthetic resins such as polyolefin, polyester, polyamide, polyimide, polyether imide, polycarbonate, polyphenylene ether, polyether sulfone, polysulfone, polyether etherketone, polyarylene, polyacetal, polyvinylidene fluoride, polyethylene tetrafluoride, polystyrene, ABS resin, epoxy resin, urethane resin, silicone resin and phenol resin and (iv) elastomers such as polyolefin rubber, fluorine rubber, silicone rubber, hydrogenated SBR, butyl rubber, polyester rubber and polyamide rubber.

It is also possible to further add an additive such as a coupling agent, antioxidizing agent, coloring agent, ultraviolet absorber and wax, if necessary.

In order to utilize the characteristic of a PATE composition of the present invention effectively, it is preferable that the blend contains at least 25 vol%, more preferably not less than 30 vol%, particularly preferably not less than 50 vol% of PATE (A).

As an example of such blend, a blend containing 0.01 to 15 parts by weight of nucleating polymer and 0.1 to 300 parts by weight of an inorganic filler and/or a fibrous filler based on 100 parts by weight of a PATE (A) which contains a repeating unit of

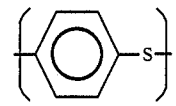

as the main constituent will be cited. Of course, this blend may further contain the above synthetic resin (iii) and/or elastomer (iv).

A PATE composition (including a blend) of the present invention is applicable to various fields by taking advantage of its characteristics such as a high crystallization rate and fine spherulites. For example, it can preferably be processed to various product by injection molding and sheets, films, pipes and fibers by extrusion molding and because of its short cycle of melt molding, an injection molding is especially preferable.

EXAMPLE

Methods of measuring (1) Measurement of crystallization rate

The 50% crystallization time, $\tau_{\frac{1}{2}}$, was obtained by an ordinary method [e.g., a method described on p. 155 of KOBUNSHI KAGAKU. 25 (1968)] using DSC7 manufactured by Perkin Elmer.

The measuring conditions were as follows:

After melting about 10 mg of rapidly cooled press sheet of each sample at 340° C. in a nitrogen gas flow for one minute, it was rapidly cooled to its crystallization temperature and an isothermal crystallization curve at the temperature was obtained.

From the isothermal crystallization curve, time period necessary for crystallizing half of the crystallizable components, $\tau_{\frac{1}{2}}$, was obtained.

A short 50% crystallization time means a high crystallization rate.

(2) Measurement of spherulite size

After melting the rapidly cooled press sheet of each sample at 340° C. in a nitrogen gas flow for one minute, it was rapidly cooled to 250° C. to have isothermally crystallized. The size of spherulites, at the time they collided with each other under an isothermal crystallization, was measured by a polarizing microscope provided with a heating stage (cooling and heating device, TH-600, for microscope, manufactured by Lincam Co.).

(3) Measurement of melt viscosity

The melt viscosity was measured by using a capillograph, manufactured by TOKYO SEIKI, under the following conditions:

temperature: 310° C.

nozzle: L/D =10mm/1mm shear rate: 200/second or 10,000/second (a) Preparation of

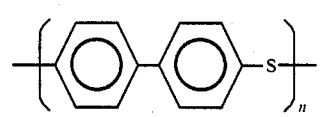

polymer (hereinafter referred to as "PBS")

A polymer represented by the formula

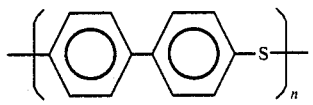

was obtained by polymerizing 4,4'-dibromobiphenyl and Na$_2$S in the presence of H$_2$O and NMP in the following mol ratio at 220° C. for 5 hours:

| | |
|---|---|
| 4,4'-dibromobiphenyl | 0.50 mol |
| Na$_2$S | 0.50 mol |
| H$_2$O | 0.75 mol |
| NMP | 5.0 mol |

Tm of the obtained polymer was 430° C. and Tc$_2$ was 300° C..

(b) Production of PBS copolymer

A random copolymer of

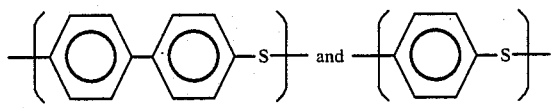

(hereinafter referred to as "PBS copolymer") was obtained by polymerizing 4,4'-dibromobiphenyl, paradichlorobenzene and Na$_2$S in the presence of H$_2$O, NMP and NaOH in the following mol ratio at 220° C. for 5 hours:

| | |
|---|---|
| 4,4'-dibromobiphenyl | 0.25 mol |
| paradichlorobenzene | 0.25 mol |
| Na$_2$S | 0.50 mol |
| H$_2$O | 0.75 mol |
| NMP | 5.0 mol |
| NaOH | 2.0 g |

Tm of the obtained polymer was 370° C.

EXAMPLE 1

42.4 kg of hydrated sodium sulfide (purity: 46.18%) and 95 kg of NMP were charged into an autoclave, and the content was heated to about 190° C. to distill out water of 10.5 kg. Then, 36.4 kg of p-dichlorobenzene was added to the mixture and polymerized at 220° C. for 5 hours.

7 kg of water were additionally charged and the temperature was raised to 255° C. and the polymerization was performed for 5 hours.

The polymer was separated from the reaction mixture with a screen, washed with methanol and then water and further washed with an aqueous 2% solution of NH$_4$Cl and water and then dried to obtain a PATE (A).

The apparent melt viscosity at 310° C. and at a shear rate of 200/second of the PATE (A) was 2,300 poise.

To the powdery polymer [PATE (A)], each of the nucleating polymer listed in Table 1 was added and mixed by a Henshell mixer. The mixture was extruded into pellets by an extruder (BT-30, manufactured by Plabor, Co.).

The physical properties of the compositions obtained were measured and the results are shown in Table 1.

As is clear from Table 1, the PATE compositions of the present invention have very high crystallization rate and show that the nucleating polymer according to the present invention is also effective on a blend containing glass fibers.

EXAMPLE 2

TABLE 1

| | Amount of PBS (parts by weight)*[1] | t½ at 250° C. (second) | |
|---|---|---|---|
| | | Without GF | With GF*[2] |
| Control | 0 | 185 | 370 |
| Experiment 1 | 1.0 | 40 | 31 |
| Experiment 2 | 12 | 38 | 30 |

*[1]Amount based on 100 parts by weight of PATE (A)
*[2]GF: Glass Fiber, 13 μm in diameter (manufactured by NITTO BOSEKI Co.,Ltd.). Added 40 wt % based on the total weight of the composition 42.4 kg of hydrated sodium sulfide (purity: 46.0%) and 100 kg of NMP were charged into an autovalve and the content was heated to about 190° C. to distill out water of 16.5 kg. Then, 40.9 kg of paradichlorobenzene was added to the mixture and the polymerization was performed at 220° C. for 5 hours.

7.7 kg of water was additionally charged and the temperature was raised to 260° C. and the polymerization was further performed another 3 hours.

The polymer was separated from the reaction mixture with a screen, washed with methanol and then water and further washed with an aqueous 2% solution of NH$_4$Cl and water and then dried to obtain a PATE (A).

The apparent melt viscosity at 310° C. and a shear rate of 10,000/second of the PATE (A) was 30 poise.

To 100 parts by weight of the powdery PATE (A) polymer, 1.0 part by weight of the nucleating polymer listed in table 2 was added and mixed by a Henshell mixer. The mixture was extruded into pellets by an extruder, BT-30.

The physical properties of the compositions obtained were studied and the results are in Table 2.

TABLE 2

| | Nucleating Polymer | t½ at 260° C. (second) | Size of Spherulite (μm) |
|---|---|---|---|
| Control | None | 610 | 170 |
| Experiment | PBS | 20 | 10 |

As is clear from Table 2, the PATE composition of the present invention shows a very high crystallization rate and the size of spherulite is small and uniform.

EXAMPLE 3

42.1 kg of hydrated sodium sulfide (purity: 46.3%) and 97 kg of NMP were charged into an autoclave and the content was heated to about 190° C. to distill out water of 16.9 kg. Then, 36.8 kg of p-dichlorobenzene was added to the mixture and the polymerization was performed at 220° C. for 5 hours.

6.1 kg of water was additionally charged and the temperature was raised to 260° C. and the polymerization was performed for 1.5 hours and further at 240° C. for 3.5 hours.

The polymer was separated from the reaction mixture with a screen, washed with methanol and then water and then dried to obtain a PATE (A).

The apparent melt viscosity at 310° C. and a shear rate of 200/second of the PATE (A) was 1,500 poise.

To 100 parts by weight of the powdery PATE (A) polymer, 1.0 part by weight of the nucleating polymer listed in Table 3 was added and mixed by a Henshell Mixer. The mixture was extruded into pellets by an extruder.

The physical properties of the compositions obtained were measured and the results are in Table 3.

TABLE 3

| | Nucleating Polymer | $t_{\frac{1}{2}}$ at 250° C. (second) |
|---|---|---|
| Control | None | 2,100 |
| Experiment | PBS | 49 |

As is clear from Table 3, the composition of the present invention alsoshowed a very high crystallization rate even when prepared from the PATE (A) which had not been treated with NH4Cl after polymerization and had a very slow crystallization rate.

EXAMPLE 4

4 kg of NMP and 1.87 kg of hydrated sodium sulfide (purity: 45.9%) were charged into a polymerizer and the content was heated to about 200° C. to distill out water of 0.77 kg.

Then, 1.55 kg of metadichlorobenzene, 2.11 kg of NMP and 0.05 kg of H2O were added to the mixture and the polymerization was performed at 220° C. for 2 hours and further at 230° C. for 7 hours to obtain a slurry of polymetaphenylene sulfide.

Separately, 7.5 kg of NMP and 3.06 kg of hydrated sodium sulfide (purity: 45.9%) were charged into an autoclave and the content was heated to about 200° C. to distill out water of 12.7 kg.

Then, 2.64 kg of p-dichlorobenzene, 2.5 kg of NMP, 0.1 kg of H2O and 2.32 kg of the slurry of polymetaphenylene sulfide obtained above were added to the mixture and the polymerization was performed at 220° C. for 10 hours.

1.3 kg of H2O was added and the polymerization was further performed at 260° C. for 4 hours.

The polymer was separated from the reaction mixture with a screen, washed with methanol and then water, further washed with an aqueous 2% solution of NH4Cl and water and then dried to obtain a PATE (A). The apparent melt viscosity at 310° C. and a shear rate of 200/second of the PATE (A) was 1,000 poise.

To 100 parts by weight of the powdery PATE (A) polymer, 1.0 part by weight of each of the nucleating polymer listed in Table 4 was added and mixed by a Henshell mixer. The mixture was extruded into pellets by an extruder, BT-30.

The physical properties of the composition obtained were studied and the results are shown in Table 4.

TABLE 4

| Nucleating Polymer | $t_{\frac{1}{2}}$ at 250° C. (second) |
|---|---|
| None | 300 |
| PBS | 55 |
| PBS Copolymer | 47 |

As is clear from Table 4, the PATE composition of the present invention also shows a very high crystallization rate when the PATE (A) is a phenylene sulfide block copolymer and further, when a nucleating polymer is a copolymer, it still has the nucleating effect.

What is claimed is:

1. A polyarylene thioether composition comprising:
100 parts by weight of (A) which contains not less than 70 wt % of a repeating unit of

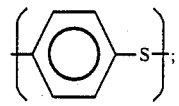

and
0.01 to 15 parts by weight of a polyarylene thioether (B), which is a nucleating agent and contains not less than 50 wt % of a repeating unit of

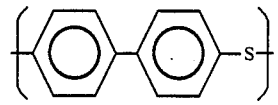

as the main constituent and has a melting point of not lower than 290° C. or a melt crystallization temperature of not lower than 220° C.; and
a 50% crystallization time, $\tau_{\frac{1}{2}}$, at 250° C. of said polyarylene thioether composition being not more than 1/1.5 of the 50% crystallization time of a polyarylene thioether which does not contain said polyarylene thioether (B).

2. The polyarylene thioether composition according to claim 1, wherein said polyarylene thioether (A) is a block copolymer of 70 to 95 wt % of a repeating unit of

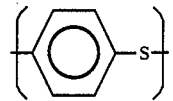

and 5 to 30 wt % of a repeating unit of

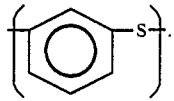

3. The polyarylene thioether composition according to claim 1, wherein said polyarylene thioether (B) is a p,p'-diphenylene thioether homopolymer.

4. The polyarylene thioether composition according to claim 3, wherein said p,p'-diphenylene thioether homopolymer is a polymer having a melting point of 400° to 450° C. or a melt crystallization temperature of 280° to 350° C..

5. The polyarylene thioether composition according to claim 1, wherein said polyarylene thioether (B) is a copolymer containing not less than 50 wt % of p,p'-diphenylene thioether and less than 50 wt % of p-phenylene thioether.

6. A polyarylene thioether composition comprising:
100 parts by weight of a polyarylene thioether (A) which contains not less than 70 wt % of a repeating unit of

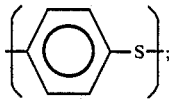

0.01 to 15 parts by weight of a polyarylene thioether (B), which is a nucleating agent and contains not less than 50 wt % of a repeating unit of

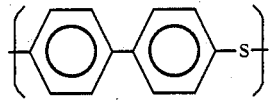

as the main constituent and has a melting point of not lower than 290° C. or a melt crystallization temperature of not lower than 220° C.; and 0.1 to 300 parts by weight of an inorganic filler, a fibrous filler or a mixture of two or more thereof;

and a 50% crystallization time, $\tau_{\frac{1}{2}}$, at 250° C. of said polyarylene thioether composition is not more than 1/1.5 of a 50% crystallization time of a polyarylene thioether composition which does not contain said polyarylene thioether (B).

7. The polyarylene thioether composition according to claim 6, wherein said polyarylene thioether (A) is a block copolymer of 70 to 95 wt % of a repeating unit of

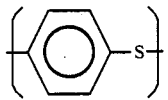

and 5 to 30 wt % of a repeating unit of

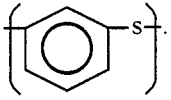

8. The polyarylene thioether composition according to claim 6, wherein said polyarylene thioether (B) is a p,p'-diphenylene thioether homopolymer.

9. The polyarylene thioether composition according to claim 8, wherein said p,p'-diphenylene thioether homopolymer is a polymer having a melting point of 400° to 450° C. or a melt crystallization temperature of 280° to 350° C.

10. The polyarylene thioether composition according to claim 6, wherein said polyarylene thioether (B) is a copolymer of not less than 50 wt % of p,p'-diphenylene thioether and less than 50 wt % of p-phenylene thioether.

* * * * *

UNITED STATES PATENT AND TRADEMARK OFFICE
CERTIFICATE OF CORRECTION

PATENT NO. : 4,837,294
DATED : June 6, 1989
INVENTOR(S) : ICHIKAWA ET AL

It is certified that error appears in the above-identified patent and that said Letters Patent is hereby corrected as shown below:

In the Abstract, line 15, delete "$t_{\frac{1}{2}}$", and insert -- $\tau_{\frac{1}{2}}$ --.

In column 6, line 38, insert one space between "$Tc_2$" and "satisfy".

In column 10, line 1 of TABLE 1, delete "$t_{\frac{1}{2}}$", and insert -- $\tau_{\frac{1}{2}}$ --;

In line 1 of TABLE 2, delete "$t_{\frac{1}{2}}$", and insert -- $\tau_{\frac{1}{2}}$ --.

In column 11, line 1 of TABLE 3 and 4, delete "$t_{\frac{1}{2}}$", and insert -- $\tau_{\frac{1}{2}}$ --.

Signed and Sealed this

Twenty-fourth Day of September, 1991

Attest:

HARRY F. MANBECK, JR.

Attesting Officer

Commissioner of Patents and Trademarks